United States Patent
Heintges et al.

(10) Patent No.: US 6,629,810 B1
(45) Date of Patent: Oct. 7, 2003

(54) PROTECTING CAP

(76) Inventors: Sebastian Heintges, Alemannenstrasse 39, D-56567 Neuwied (DE); Lothar Schmitz, Alemannenstrasse 39, D-56567 Neuwied (DE)

(*) Notice: Subject to any disclaimer, the term of this patent is extended or adjusted under 35 U.S.C. 154(b) by 0 days.

(21) Appl. No.: 09/937,454

(22) PCT Filed: Mar. 17, 2000

(86) PCT No.: PCT/DE00/00880

§ 371 (c)(1),
(2), (4) Date: Feb. 15, 2002

(87) PCT Pub. No.: WO00/60246

PCT Pub. Date: Oct. 12, 2000

(30) Foreign Application Priority Data

Apr. 1, 1999 (DE) .................... 299 06 012 U

(51) Int. Cl.[7] ................................ F16B 37/14
(52) U.S. Cl. .................. 411/372.6; 411/431
(58) Field of Search ............... 411/431, 377, 411/327.5, 372.6, 373

(56) References Cited

U.S. PATENT DOCUMENTS

| | | | | |
|---|---|---|---|---|
| 972,140 | A | * | 10/1910 | Adam |
| 1,328,488 | A | * | 1/1920 | Bowden |
| 3,298,272 | A | * | 1/1967 | Henderson |
| 4,167,886 | A | * | 9/1979 | Seghezzi |
| 4,784,555 | A | * | 11/1988 | Cantrell |
| 4,826,380 | A | * | 5/1989 | Henry |
| 4,890,967 | A | * | 1/1990 | Risenbaum |
| 5,028,093 | A | * | 7/1991 | Nason |
| 5,082,409 | A | * | 1/1992 | Bias |

* cited by examiner

*Primary Examiner*—Flemming Saether
(74) *Attorney, Agent, or Firm*—Marianne Fuierer; Steven J. Hultquist; Yongzhi Yang

(57) ABSTRACT

The invention relates to a protecting cap for the head of a screw that is screwed into a constructional part. A body (2:7) is arranged between the protecting cap (1) and the screw head (3) and produces a positive and a non-positive fit therebetween. The protecting cap protects the screw head from mechanical damage, soiling or corrosion.

8 Claims, 2 Drawing Sheets

PROTECTING CAP

CROSS-REFERENCE TO RELATED APPLICATIONS

Figure 1:
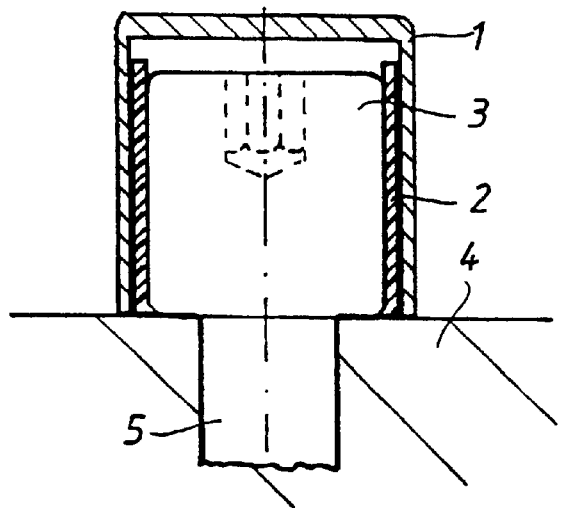
Figure 3:
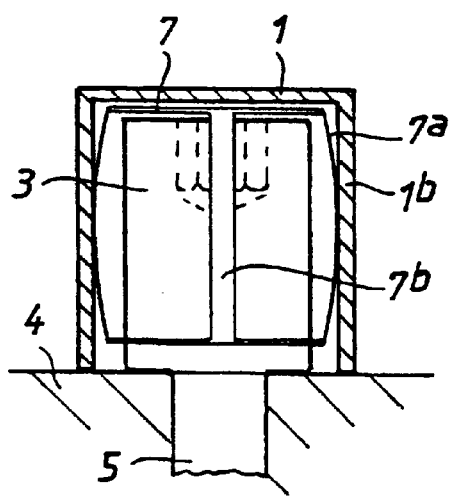

This application is filed under the provisions of 35 U.S.C. §371 and claims the priority of International Patent Application No. PCT/DE00/00880 filed Mar. 17, 2000, which in turn claims priority of German Paten Application No. 299 06 012.8 filed Apr. 1, 1999.

The invention pertains to a protecting cap for the head of a screw that is screwed into a constructional part.

Numerous designs of protecting caps for screw heads are known. These protecting caps are usually realized in the form of injection molded plastic parts that can be placed onto the screw head due to their ductility and protect the screw head from soiling, corrosion and mechanical damages. One disadvantage of known protecting caps can be seen in the fact that they do not remain firmly seated over time. Aging of the cap material can cause the protecting cap to become loose, in particular, under the influence of vibrations or other mechanical effects.

U.S. Pat. No. 5,707,113 pertains to protecting and mounting caps for hubcaps. The protecting caps are placed onto the protruding threaded bolts of the wheels that are mounted with screws. In one preferred embodiment, the protecting cap of plastic contains an inner metal clip that is engaged with the thread after the protecting cap is attached.

FR-A-2 086 693 pertains to a cover plate for a screw. In this case, a lower part is fixed on the substrate by means of the screw to be covered. Subsequently, a cap is attached and held by the lower part. The lower part is not arranged between the lateral surfaces of the screw head and the inner side of the surface area of the protecting cap, but rather held on the substrate due to the clamping effect of the screw.

DE 1 137 098 pertains to facing elements for covering electrical devices. This document discloses a holding device that comprises encompassing springable parts that are held on the substrate by mounting screws and into which pins that are tapered within the central section can be inserted. The encompassing springable parts are not arranged between the lateral surface of the screw head and the inner side of the surface area of the protecting cap.

U.S. Pat. No. 4,784,555 pertains to a cover plate for screws and bolts. In this case, a O-ring is arranged on the inner side of the cap. The inside diameter of the O-ring is smaller than the outside diameter of the bolt. In order to achieve a non-positive connection between the cap and the O-ring, the inner side of the cap contains a groove, into which the O-ring engages.

The present invention is based on the objective of developing a protecting cap for the head of a screw which is held on the screw head by means of a firm press fit. The invention also aims to provide a protecting cap that remains securely seated even at elevated temperatures. Additional advantages of the protecting cap according to the invention are disclosed in the following description.

According to the invention, this objective is attained with a protecting cap of the initially described type due to the fact that a body is arranged between the protecting cap and the screw head which produces a positive or non-positive fit between the protecting cap and the screw head. In order to fulfill its function, the body has a sufficient elasticity for holding the cap on the screw head. The shape of the screw head and the protecting cap may differ, i.e., the body used for producing the connection needs to be correspondingly adapted. The screw head may, in particular, have a cylindrical or hexagonal-prismatic shape. The connection is, in principle, designed such that the protecting cap can be manually attached and detached, but unable to detach on its own under the respective operating conditions.

In one preferred embodiment of the protecting cap according to the invention, the body is realized in the form of a ring or cap of an elastic material and arranged between the lateral surface of the screw head and the inner side of the surface area of the protecting cap. The ring or cap may consist of rubber or an elastomer plasticmaterial. This body can be permanently fixed in the protecting cap during its manufacture such that it does not have to be attached onto the screw head separately of the protecting cap. The elastic ring is subjected to a clamping effect when the protecting cap is attached and thusly produces a secure connection between the cap and the screw head. If the body can be subjected to a thermal load, e.g., up to 220° C., the protecting cap is also securely held on the screw head at elevated permanent temperatures.

In one special embodiment of the protecting cap for a screw head situated in a flat sink, the protecting cap has such dimensions that the sink is sealed in a flush and essentially gap-free fashion. In this case, the outside diameter of the protecting cap corresponds to the inside diameter of the sink, and the height of the protecting cap corresponds to the depth of the sink. The protecting cap not only protects the screw head, but also completely fills out the sink such that an appealing and barely visible appearance of the screw connection is achieved.

Figure 2:
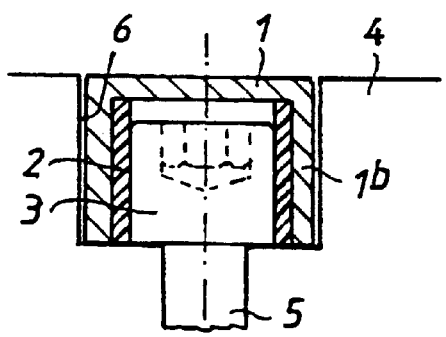
Figure 4:
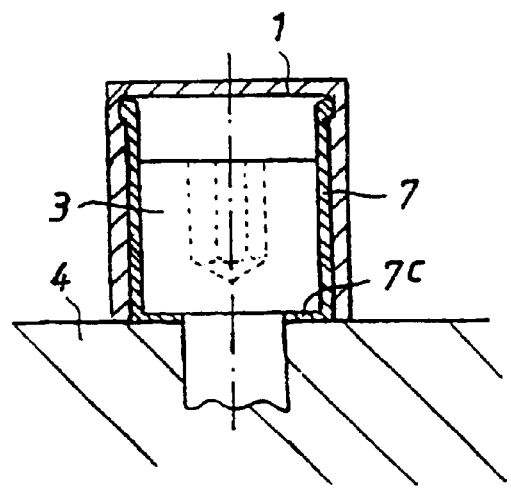
Figure 5:
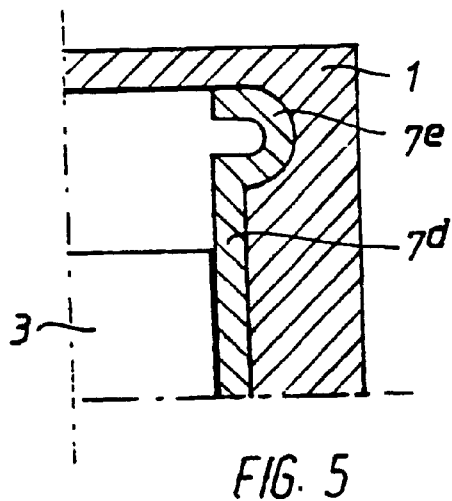
Figure 6:
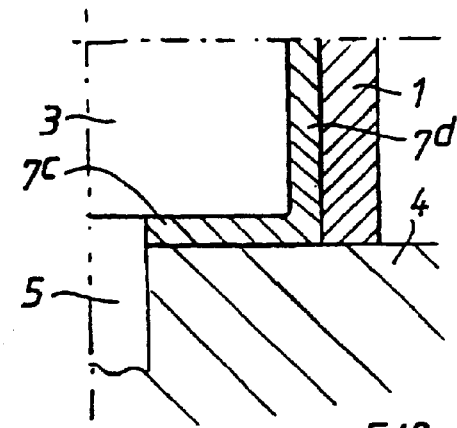
Figure 7:
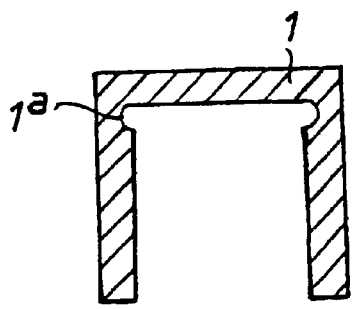
Figure 8:
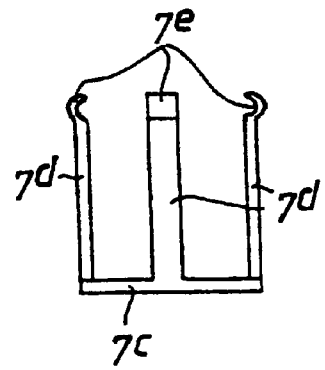
Figure 9:
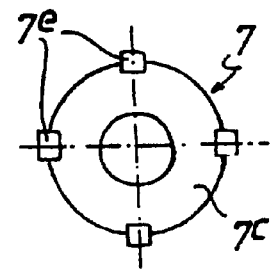

The above-mentioned embodiments of the protecting cap according to the invention are described in greater detail below with reference to figures. The figures show:

FIG. 1, a screw that is screwed into a constructional part and provided with the first embodiment of the protecting cap according to the invention;

FIG. 2, an embodiment of the protecting cap which corresponds to that shown in FIG. 1, however, for a screw head situated in a sink;

FIG. 1 shows a screw, the shaft 5 of which is screwed into a constructional part 4. A cap is attached onto the screw head 3, wherein an elastic annular body 2 is arranged between the cap and the lateral surface of the screw head 3. This elastic annular body is pressed between the parts 1 and 3 and thusly holds the protecting cap on the screw head. The embodiment according to FIG. 2 only differs from the embodiment according to FIG. 1 with respect to the fact that the screw head 3 is situated in a flat sink 3 and the protecting cap 1 has such dimensions that it ends flush with the plane outer side of the constructional part 4 after it is attached onto the screw head 3.

The protecting cap according to the invention provides advantages in several respects. It protects the screw head 3 from shocks, soiling or corrosion that may occur if the surface of the screw head contains a protective layer that is damaged when the screw is tightened. The protecting cap can be reused several times and usually detached without requiring a tool. The risk of injuries as a result of the protruding screw head is significantly reduced. The protecting cap according to FIGS. 1–2 can also be easily retrofitted on existing screw connections. The protecting cap preferably consists of metal.

What is claimed is:

1. A protecting cap for the head of a screw that is screwed into a constructional part comprising:

a protecting cap that fits over the head of the screw, wherein the protecting cap has a smooth inner lateral surface; and a body, wherein the body is arranged between the protecting cap and the screw head to produce a positive or non-positive fit between the protecting cap and the screw head, and wherein the body is in the form of a tubular ring that covers the entire inner lateral surface of the protecting cap and consisting of an elastic material which is arranged between the lateral surface of the screw head and the inner lateral surface of the protecting cap.

2. The protecting cap according to claim 1, wherein the protecting cap is used in a construction part having a recessed sink and the protecting cap has such vertical and radial dimensions that the sink can be sealed by the protecting cap in a flush and a gap-free fashion.

3. The protecting cap according to claim 1, wherein the elastic material is rubber.

4. The protecting cap according to claim 3, wherein the material of the body can be subjected to a thermal load of up to 220° C.

5. The protecting cap according to claim 1, wherein the protecting cap is constructed of metal.

6. The protecting cap according to claim 1, wherein the inner lateral surface of the protecting cap is planar.

7. The protecting cap according to claim 1, wherein the elastic material is an elastomer plastic material.

8. The protecting cap according to claim 1, wherein the body is in the form of a cap that contacts the entire inner lateral surface of the protecting cap.

* * * * *

UNITED STATES PATENT AND TRADEMARK OFFICE
CERTIFICATE OF CORRECTION

PATENT NO.    : 6,629,810 B1                                                Page 1 of 1
DATED         : October 7, 2003
INVENTOR(S)   : Heintges et al.

It is certified that error appears in the above-identified patent and that said Letters Patent is hereby corrected as shown below:

Column 2,
Line 12, "elastomer plasticmaterial" should be -- elastomeric plastic material --

Column 4,
Line 12, "elastomer" should be -- elastomeric --

Signed and Sealed this

Second Day of December, 2003

JAMES E. ROGAN
*Director of the United States Patent and Trademark Office*